Feb. 3, 1970  H. MORGAN  3,493,259
STRAPLIFT LOADING SYSTEM
Filed Jan. 25, 1968  3 Sheets-Sheet 1
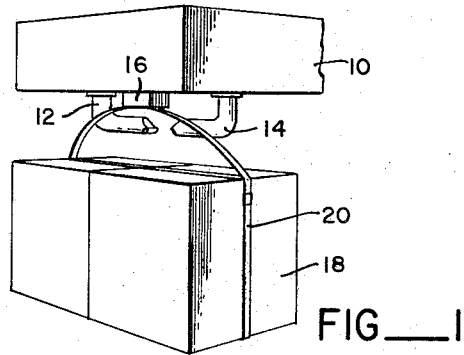
FIG__1
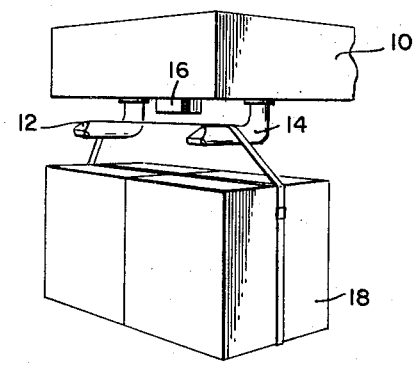
FIG__2
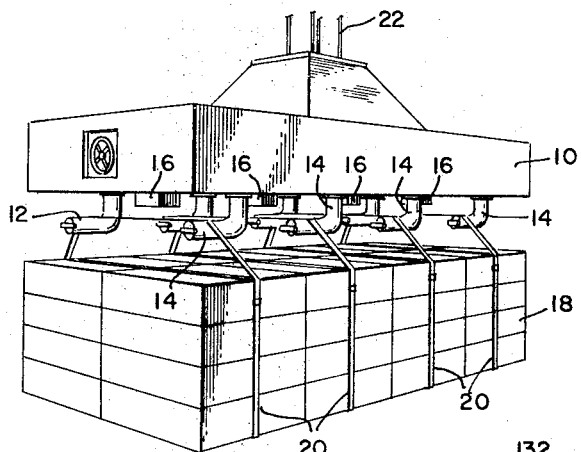
FIG__3
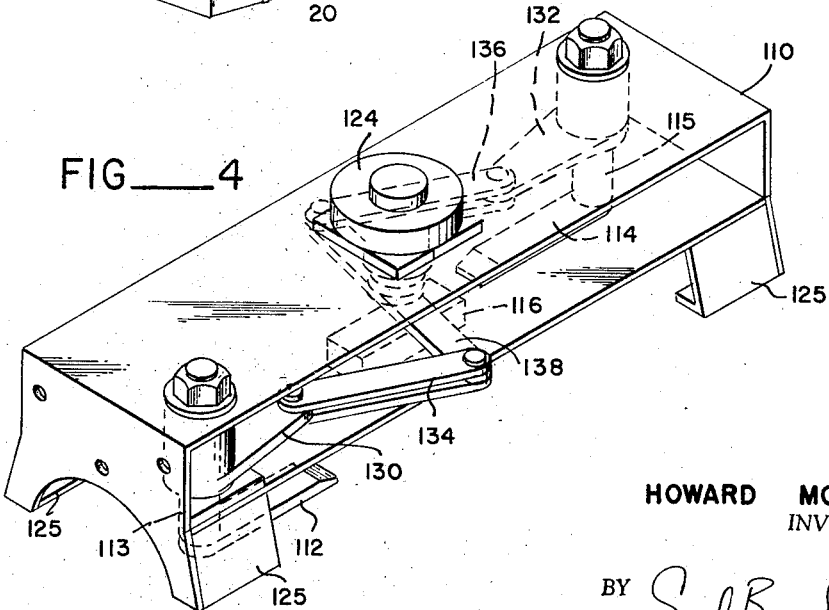
FIG__4
HOWARD MORGAN
INVENTOR.
BY *Seed, Berry Dowrey*
ATTORNEYS

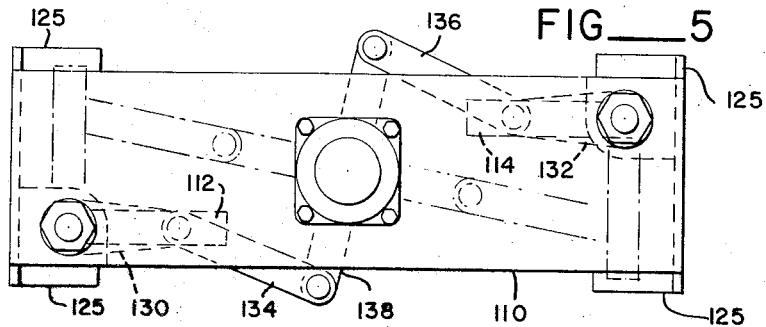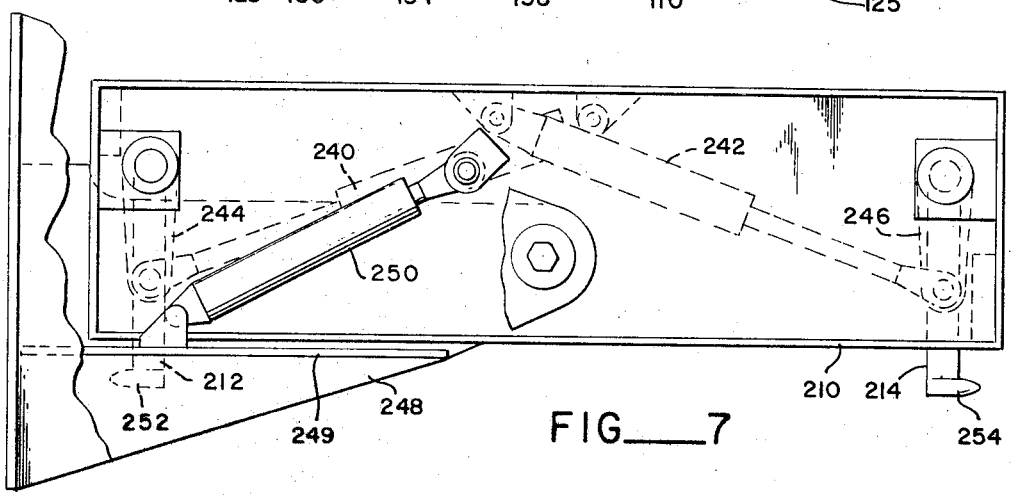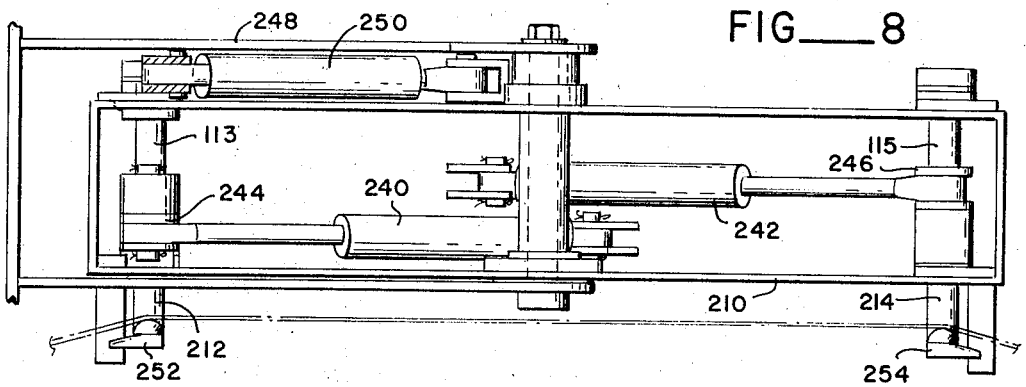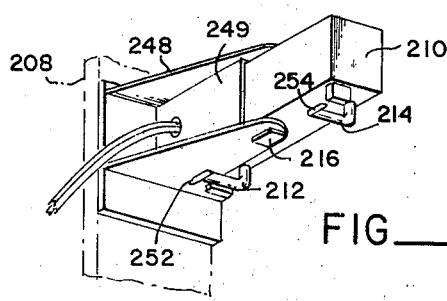

Feb. 3, 1970   H. MORGAN   3,493,259
STRAPLIFT LOADING SYSTEM
Filed Jan. 25, 1968   3 Sheets-Sheet 3
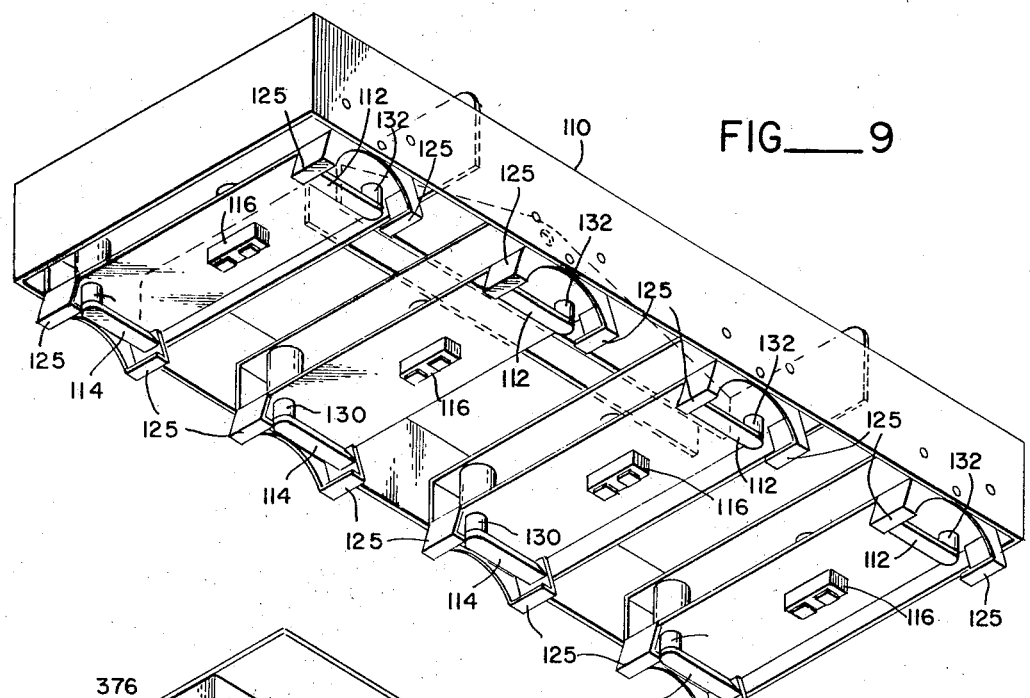
FIG__9
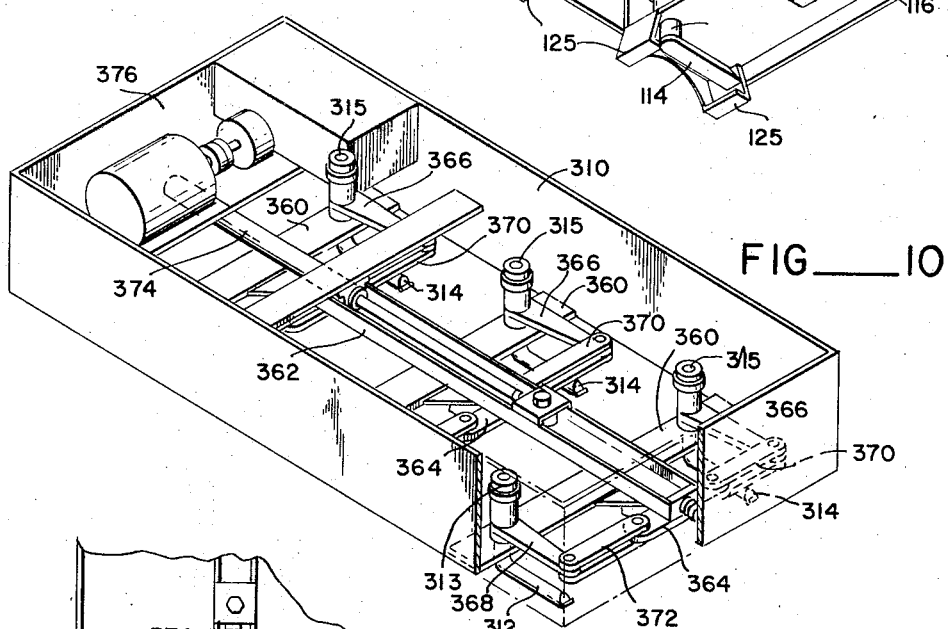
FIG__10
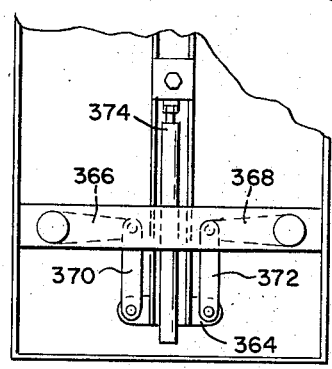
FIG__11
HOWARD MORGAN
INVENTOR.
BY *Seed, Berry & Dowrey*
ATTORNEYS United States Patent Office 3,493,259
Patented Feb. 3, 1970

3,493,259
STRAPLIFT LOADING SYSTEM
Howard Morgan, Vancouver, British Columbia, Canada, assignor to Skagit Corporation, Sedro Woolley, Wash., a corporation of Washington
Filed Jan. 25, 1968, Ser. No. 706,739
Int. Cl. B66c *1/00, 1/12*
U.S. Cl. 294—74    16 Claims

ABSTRACT OF THE DISCLOSURE

A strapped load can be lifted by positioning a straplift device over the load and horizontally slewing load-lifting arms of the straplift device through the top load-lifting strap arch of the strapped load and suspendingly lifting the load by the strap.

---

This invention relates to load-lifting systems for lifting strapped loads by engaging and lifting a strap loop that extends above the top of the load.

Lumber, plywood, bales of pulp, and other materials are often strapped into prepackaged units for shipment. By providing a load-lifting strap loop or loops at the top of these prepackaged units, a straplift type of load lifting apparatus can be positioned over a load to engage the top strap loop or loops for loading and unloading the prepackaged unit. Such a system is particularly suitable for loading a cargo ship and other transport vehicles where limited storage space dictates against palletizing the cargo. Such a system is also suitable where limited space at the loading area makes the use of the fork lift type of vehicle difficult or otherwise undesirable. Furthermore, such a system lends itself to the use of relatively inexpensive apparatus for accomplishing bulk loading and unloading.

FIG. 1 depicts one embodiment of the invention, adapted to engage a single load-lifting strap loop, shown in a non load-lifting position;

FIG. 2 depicts the FIG. 1 embodiment in a load-lifting position;

FIG. 3 depicts an assembly of FIGS. 1–2 units adapted to engage a plurality of load-lifting strap loops at the same time;

FIG. 4 depicts in side elevation another embodiment adapted to engage a single load-lifting strap loop;

FIG. 5 depicts the FIG. 4 embodiment in top plan view;

FIG. 6 depicts another embodiment adapted to be carried by a lift mast of a lift vehicle;

FIG. 7 depicts the FIG. 6 embodiment in top plan view;

FIG. 8 depicts the FIG. 6 embodiment in side elevation view;

FIG. 9 depicts an assembly of FIGS. 4–5 unit adapted to engage a plurality of load-lifting strap loops at the same time;

FIG. 10 depicts another assembly of units adapted to engage a plurality of load-lifting strap loops at the same time; and FIG. 11 is a detailed top plan view of the FIG. 10 embodiment.

In brief, the apparatus of this invention comprises a frame adapted to be positioned over a strapped load, load lifting means carried by the frame and adapted to be slewed underneath a load-lifting strap or straps at the top of the load by pivotable extension or otherwise and means carried by the frame for slewing the load lifting means into and out of load lifting relation to the top strap loop or loops. The frame may be supported in a variety of ways, such as by suspension cables from a loading boom or by the lift mast of a lift vehicle. Magnet means, either permanent or electro, are employed to contact the top strap loop and hold the loop away from the top of the load preparatory to the load lifting means being slewed into a load-lifting position.

The load lifting means preferably comprises arms cantilevered from rotatable shafts and pivotable about the shaft axis of rotation. The arms and their respective shafts may be forged as a unit or provided as separate units welded or otherwise integrally connected. The arms are paired with the arms of each pair being positioned on opposite sides of the frame with magnet means being disposed between the arms of each such pair. The arms extend inward toward one another when in a non load-lifting position and pivot outward under a load-lifting position, the loop being arched upward by contact with the magnet means to facilitate pivotal passage of the arms through the loop.

The load-lifting arm slewing means may be designed to either pivot the arms outward to either point in the same direction relative to the frame or point in opposite directions relative to the frame. In the first case, the arms would be positioned on the same side of a load-lifting strap loop and in the second case the arms would be positioned to straddle the loop.

Referring to FIGS. 1 and 2, the apparatus of one embodiment of this invention is shown as comprising a frame 10, load-lifting means comprising left and right hand load lifting arms or hooks 12 and 14 pivotably connected to and horizontally cantilevered below the underside of the frame, and magnet means 16 connected to the underside of the frame between the two arms 12 and 14. When the frame 10 is properly positioned over a strapped load 18 with the arms turned inward toward one another as shown, the magnet 16 will contact the lifting loop section of the metal strap 20 and thereby hold the loop open for the arms 12 and 14. Means within the frame for extending the arms through the loop section can then be actuated to pivot the arms outward and underneath the top strap to the position shown in FIG. 2, the strap loop being drawn away from the magnet and taut across the arms. The frame can then be raised to lift the load.

FIG. 3 depicts a gang of four sets of left and right hand load lifting arms 12 and 14 carried by a common frame 10 which is itself suspended from above by a cable arrangement 22. As in the FIGS. 1 and 2 embodiment, the arms pivot in toward one another and out in the same directions relative to the frame 10. This embodiment is suitable for lifting several independently strapped loads at once, and for lifting an elongated load having several sets of load-lifting straps positioned along its length.

FIGS. 4 and 5 depict another embodiment wherein a single set of horizontal load lifting arms 112 and 114 are carried by the frame 110. In this embodiment the arms are cantilevered from vertical rotatable shafts 113 and 115 that are pivotally journalled in diagonally opposite corners of the frame. The vertical shafts are interconnected by suitable linkages to a rotary actuating means 124 mounted between and in line with the vertical shafts. The arms in this embodiment extend inward, parallel to one another and to the sides of the frame, when in a non strap-engaging position. When the frame is positioned over a strapped load, the strap loop will extend parallel with the retracted arms and between the vertical shafts so as to be engageable with magnet means 116 carried by the frame beneath the rotary means 124. Upon actuation of the rotary means, the arms will pivot in opposite directions relative to the frame underneath the strap to positions again parallel to one another but at right angles to their retracted, non load-lifting positions. The frame is provided with four depending positioning pods or feet 125 designed to contact the load when the frame is lowered into position and support the frame at the proper height above a strapped load for the magnet to group the load-lifting strap preparatory to the arms being extended to their load-lifting positions.

The arm-operating linkages comprise equal length crank arms 130 and 132 attached to the vertical shafts 113 and 115, respectively, intermediate linkages 134 and 136 pivotally connected at one end to the free ends of the respective crank arms, and a cross link 138 rotatably connected at its midpoint to the rotary means 124 and pivotally connected at its ends to the opposite ends of the intermediate links 134–136. Thus, as the rotary means rotates the cross link 138 through 90°, the arms will also be swung through 90°

The rotary means 124 may be a hydraulically pneumatically or electrically operated rotator unit as depicted. It may alternately comprise another linkage assembly adapted to mechanically rotate a vertical shaft rotatably connected to its cross link 138 at its midpoint.

FIG. 9 depicts a gang of four sets of left and right hand load lifting arms 112 and 114 carried by a common frame 110 which is itself suspended by a cable arrangement. As in the FIGS. 4 and 5 embodiment, the arms pivot in opposite directions relative to the frame 110 when the arms are extended and retracted. This embodiment as with the FIG. 3 embodiment, is suitable for lifting several independently strapped loads at once, and for lifting an elongated load having several sets of load lifting straps positioned along its length.

FIGS. 6–8 depict another embodiment adapted to be mounted in cantilever fashion from the upright mast of a lift vehicle. In this embodiment, the frame 210 can be raised or lowered on the lift vehicle mast 208 and also can be pivoted relative to the mast for slewing the load. The horizontal load lifting arms 212 and 214 are cantilevered from vertical rotatable shafts 113 and 115 that are pivotally journalled at corresponding positions on opposite ends of the frame. The vertical shafts are adapted to be swung for retraction and extension in the same directions relative to the frame and in this regard are similar to the load lifting arms of the FIGS. 1–2 embodiment. Left and right cylinder rod assemblies 240–242 are pivotally mounted at their cylinder ends to one side of the frame and are pivotally connected at their rod ends to crank arms 244 and 246, respectively, which are attached to the respective vertical shafts 213–215. Thus, by extension and retraction of the cylinder rods, the arms will be pivoted in the manner described above in regard to the FIGS. 1–2 embodiment.

The frame is pivotally mounted at its vertical midpoint to a cantilevered support member 248 and is pivotable about its vertical midpoint by a cylinder and cylinder rod assembly 250. The cylinder end of assembly 250 is pivotally mounted to a side plate 249 of the support member 248 and the rod end of assembly 250 is attached to the top wall of the frame 210. A magnet means 216 is attached to the underside of the support member 248 below the frame vertical midpoint for contact with load lifting strap loops for formation of thte archway preparatory to extension of the load-lifting arms into their load-lifting position.

As depicted particularly in FIGS. 6–8, the free ends of the load-lifting arms of all embodiments are preferably provided with transverse, outwardly-extending guards 252 and 254, respectively. The guards facilitate passage of the arms underneath the strap loop as they are extended to a load-lifting position. As such, they are tapered on the upper side of their outer ends. These guards further, and more importantly, serve to ensure that the strap loop will be contained on the load lifting arms, it being noted that the guards extend outward beyond the arms and beyond the down-turned sections of the strap loop.

FIGS. 10 and 11 depict another gang of left and right hand load lifting arm sets wherein the arms 312–314 pivot in the same direction relative to the frame. In this embodiment, the vertical shafts 313–315 of the load lifting arms are journalled to cross beams 360 that are connected to and extend transversely to the sidewalls of the frame 310. The cross beams carry longitudinally-slidable elongated arm-actuating transfer beam 362 on the longitudinal center of the frame. The beam 362 and the arms 312–314 are interconnected by linkages comprised of cross links 364 mounted at their midpoints to the underside of the beam 362, crank arms 366 and 368 connected to the vertical shafts 313–315, and intermediate links 370 and 372 pivotally interconnecting the crank arms and the cross links. The cross links are positioned on the beam 362 relative to the vertical shafts 313–315, such that the arms are pivotably retracted inward toward one another when the beam 362 is moved to bring the intermediate links 370–372 parallel to the beam as shown in FIG. 11, and such that the arms are pivotably extended to a load-lifting position when the beam is moved to bring the intermediate links perpendicular to the beam as shown in FIG. 10. The beam 362 is shifted by an axial hydraulic cylinder and cylinder rod assembly 374 mounted at one end to an end wall of the frame and at the other end to the beam, the stroke of the assembly being equal to the spacing between the pivot points of the intermediate links 370–372. Hydraulic fluid supply means 376 are carried by the frame as shown in FIG. 10.

It is believed that the invention will have been clearly understood from the foregoing detailed description of my now preferred illustrated embodiment. Changes in the details of construction may be resorted to without departing from the spirit of the invention and it is accordingly my intention that no limitations be implied.

I claim:

1. Apparatus for lifting generally rectangular strapped loads having a strap loop overlying the load and engaging the load at opposite edges thereof, the length of the strap loop being greater than the dimension of the load beneath the strap loop so that the loop assumes a downwardly opening curve when lifted which apparatus comprises a frame adapted to be positioned over a strapped load; means for raising the top load-lifting loop; load lifting means carried by said frame and including at least two load lifting arms adapted to be slewed horizontally underneath said top load-lifting strap loop approximately at the highest point of the loop and then outwardly toward the opposite edges of the load underlying the loop; with the axes of rotation of the load lifting arms being short distances in from opposite edges of the load whereby the arms enter the strap loop at its highest point and support the load adjacent said opposite edges; spacing means extending a predetermined distance below said lifting arms and adapted to rest on the load for positioning said arms the proper distance above the load; and means carried by said frame for slewing said load lifting means.

2. Apparatus according to claim 1 wherein said load lifting means comprises at least two vertical shafts rotatably journalled to said frame, said load lifting arms being horizontally cantilevered from said vertical shafts and adapted to be pivotably extended and retracted by rotation of said vertical shafts; and wherein said means for slewing said load lifting means is connected to said vertical shafts for rotation thereof.

3. Apparatus according to claim 2 wherein said vertical shafts are on opposite sides of said strap loop and including linkage means interconnecting said slewing means and said vertical shafts and arranged to effect pivotal movement of said load lifting arms into positions pointing in opposite directions relative to said frame.

4. Apparatus according to claim 2 including means interconnecting said slewing means and said vertical shafts and arranged to effect pivotal movement of said lifting arms into positions pointing in the same directions relative to said frame.

5. Apparatus according to claim 2 wherein said slewing means comprises hydraulic cylinder and cylinder rod assemblies pivotally connected to said frame and to said vertical shafts and arranged to effect pivotal movement of said load lifting arms into positions pointing in the same direction relative to said frame.

6. Apparatus according to claim 2 wherein said frame is adapted to be carried by a lift mast of a lift vehicle; and including a cantilevered support member mounting said frame for attachment to the lift mast.

7. Apparatus according to claim 6 wherein said frame is rotatably carried by said support member at a vertical pivot point; and including hydraulic cylinder and cylinder rod means connected to said frame and said support member for horizontally slewing said frame relative to the lift mast.

8. Apparatus according to claim 2 wherein said lifting means includes means mounted by said frame between said load lifting arms and adapted to contact the top load lifting strap to raise and hold such strap above the load preparatory to slewing said load lifting arms into load lifting position.

9. Apparatus according to claim 1 wherein said load lifting means comprises a plurality of load lifting arms sets, each set comprising left and right hand vertical shafts rotatably journalled to said frame and left and right hand load lifting arms horizontally cantilevered from the respective vertical shafts; and wherein said means for slewing said load lifting means is connected to said vertical shafts for rotation thereof.

10. Apparatus according to claim 9 including a plurality of linkage means interconnecting said slewing means and said vertical shafts, each such linkage means interconnecting the left and right hand vertical shafts of the respective load lifting arm set to effect pivotal movement of said load lifting arms of each set into positions pointing in opposite directions relative to said frame.

11. Apparatus according to claim 9 including a plurality of linkage means interconnecting said slewing means and said vertical shafts, each such linkage means interconnecting the left and right hand vertical shafts of the respective load lifting arm set to effect pivotal movement of said load lifting arms of each set into positions pointing in the same directions relative to said frame.

12. Apparatus according to claim 10 wherein said slewing means comprises a plurality of rotators, each such rotator being rotatably interconnected to one of said linkage means for actuation of the load lifting arms of the respective set.

13. Apparatus according to claim 11 wherein said slewing means comprises an elongated transfer beam interconnected to each linkage means, and hydraulic means adapted to longitudinally reciprocate said transfer beam to effect pivotal movement of the load lifting arms of each set.

14. Apparatus according to claim 9 wherein said loop raising means includes a plurality of magnet means, each such means being mounted by said frame between the load lifting arms of the respective set and adapted to contact a top load lifting strap loop to hold such loop above the load preparatory to slewing the load lifting arms of the respective set into load lifting positions.

15. The apparatus defined in claim 8 wherein said raising and holding means includes a magnet.

16. The apparatus defined by claim 2 wherein said load lifting arms include horizontal guard means extending generally perpendicularly from the outer ends of said arms.

References Cited

UNITED STATES PATENTS

| | | |
|---|---|---|
| 1,767,525 | 6/1930 | Hoffman. |
| 3,180,671 | 4/1965 | Bachmann ---------- 294—81 |

FOREIGN PATENTS

| | | |
|---|---|---|
| 138,722 | 11/1960 | U.S.S.R. |
| 922,791 | 4/1963 | Great Britain. |
| 958,539 | 5/1964 | Great Britain. |

ROBERT G. SHERIDAN, Primary Examiner

G. F. ABRAHAM, Assistant Examiner

U.S. Cl. X.R.

294—81